United States Patent [19]

Schmidt

[11] Patent Number: 4,610,889

[45] Date of Patent: Sep. 9, 1986

[54] LOW-TRANS FATS AND OIL- AND WATER EMULSION SPREADS CONTAINING SUCH FATS

[75] Inventor: Werner J. Schmidt, Brake, Fed. Rep. of Germany

[73] Assignee: Lever Brothers Company, New York, N.Y.

[21] Appl. No.: 695,106

[22] Filed: Jan. 25, 1985

[30] Foreign Application Priority Data

Jan. 30, 1984 [NL] Netherlands .......................... 8400270

[51] Int. Cl.$^4$ .......................... A23D 3/00; A23D 5/00
[52] U.S. Cl. ................... 426/602; 426/603; 426/607
[58] Field of Search .................. 426/603, 604, 607

[56] References Cited

U.S. PATENT DOCUMENTS

| | | | |
|---|---|---|---|
| 3,796,581 | 3/1974 | Frommhold | 426/607 X |
| 3,949,105 | 4/1976 | Wieske et al. | 426/607 |
| 4,366,181 | 12/1982 | Dijkshoorn et al. | 426/607 X |
| 4,396,639 | 8/1983 | Bodor et al. | 426/607 X |

FOREIGN PATENT DOCUMENTS

| | | |
|---|---|---|
| 1593172 | 11/1974 | Fed. Rep. of Germany . |
| 6709829 | 2/1968 | Netherlands . |
| 6903111 | 9/1969 | Netherlands . |

*Primary Examiner*—Robert Yoncoskie
*Attorney, Agent, or Firm*—Milton L. Honig; James J. Farrell

[57] ABSTRACT

A fat blend having a relatively low level of trans fatty acids, which is preferably lower than 10% is obtained by random interesterification of lauric fats, saturated fats and a minor proportion of partially hydrogenated fats. A good melting behaviour in the mouth is achieved without recourse to fractionation.

13 Claims, No Drawings

LOW-TRANS FATS AND OIL- AND WATER EMULSION SPREADS CONTAINING SUCH FATS

The present invention relates to a fat, to a process for producing such fat and to its use for the production of edible oil- and water emulsions particularly of the margarine and low-fat spread types. There is a need for spreads displaying a good coolness, no waxiness, a good stability on temperature cycling within the temperature range from 5°-25° C. and a good spreadability on bread. In recent years a need for spreads produced from fats which are substantially free from fatty acid residues in the trans configuration has arisen in some circles of dieticians, although so far no convincing scientific evidence has been provided in support of the view that such fatty acids are undesirable in the human diet.

According to the present invention a fat is produced which to a great extent meets the above desiderata and a process is provided for producing such fat, which is economical since it involves the use of relatively cheap ingredients (relatively low levels of hydrogenated fats and laurics), whereas no investments in fractionation capacity are required.

The fat according to the invention comprises: A mixture of triglycerides wherein lauric acid is present at a level ranging from 5-20 wt%, the sum of the levels of palmitic acid and stearic acid ranges from 18-40 wt%, the level of oleic acid ranges from 19-35 wt%, the level of unsaturated fatty acids in the trans-configuration is less than 15 wt% and the level of linoleic acid ranges from 18-35 wt%, up to 5 wt% of the triglycerides consisting of triglycerides (i) from 3 saturated fatty acids containing 16 to 18 C-atoms and at least 9 wt% of the triglycerides consisting of triglycerides (ii) from 2 saturated $C_{16}$- or $C_{18}$-fatty acids and 1 cis-unsaturated $C_{16}$- or $C_{18}$ fatty acid, at least 50% of triglycerides (ii) being asymmetrical.

The fat according to the invention preferably contains triglycerides (ii) at a level ranging from 10-20 wt% and has a level of trans fatty acids not exceeding 10 wt%.

The fats according to the present invention display a carbon number profile reflected in the following preferred ranges:

$C_{38} = 1-6$
$C_{40} = 2-4$
$C_{42} = 3-8$
$C_{44} = 3-8$
$C_{46} = 4-12$
$C_{48} = 8-20$
$C_{50} = 7-14$
$C_{52} = 14-22$
$C_{54} = 18-40$

The carbon number profile indicates the percentage of triglycerides having a certain number of C-atoms for the combined fatty acid residues attached to the glyceride.

The fats of the present invention preferably display the following fat solids profile (determined according to Fette, Seifen, Anstrichmittel 80, 180-186 (1978) as NMR-values after a stabilization period of 16 hours at 0° C.:

$N_{10} = 25-55$, ideally 30-50%
$N_{20} = 10-25$, ideally 12-25%
$N_{30} = 0-6$, ideally 0-4%
$N_{35} = 0-2.5$, ideally 0-1.5%

Fats which meet the above requirements are provided according to the invention by a process involving interesterification, preferably random interesterification of appropriate fats or esterification of an appropriate mixture of glycerol and fatty acids in a way known per se, and optionally adjusting the composition by mixing the interesterified mixture with non-interesterified fats. The fat blend according to the invention therefore comprises:

(i) a mixture of triglycerides obtained by random interesterification of a fat (a) rich in cis-mono-, di- and-/or polyunsaturated fatty acids, a substantially saturated fat (b) having an iodine value not exceeding 10 and consisting of triglycerides essentially from $C_{16}$- and/or $C_{18}$-fatty acids, a fat (c) rich in saturated $C_{12}$- and/or $C_{14}$-fatty acids and optionally a fat (d) having a melting point ranging from 25°-60° C., and optionally (ii) non-interesterified fat (a), (c), (d) or mixtures thereof.

In the preferred fatblend of the present invention fat (a) is selected from sunflower-, soybean-, rapeseed-, maize-, safflower- and peanut oil, fat (b) is selected from substantially fully hydrogenated sunflower-, soybean-, rapeseed-, maize-, safflower- and peanut oil and palmoil, fat (c) is selected from coconut-, palmkernel-, babassutucum- and ouricurmfat and fat (d) is selected from palmoil, partially hydrogenated palmoil and a partially hydrogenated fat (a).

Fat (b) has preferably an iodine value not exceeding 5 and preferably consists of soybeanoil hydrogenated to m.p. 60° C., sunflower oil hydrogenated to m.p. 69° C. or palmoil hydrogenated to m.p. 58° C. Fat (c) can be used as such or in fractionated from (e.g. as the olein or stearin fraction thereof obtained by solvent fraction or by dry fractionation). However, fractionation can be dispensed of since it is not crucial for obtaining satisfactory products.

The preferred blends according to the invention comprise:

(i) a mixture of triglycerides obtained by random interesterification of 20-50 wt% fat (a), 5-30 wt% fat (b), 10-45 wt% fat (c) and 0-35 wt% fat (d) (all percentages as based on the weight of the interesterified mixture), said interesterified mixture constituting 50-100 wt% of the total fat blend and optionally (ii) a non-interesterified fat consisting of up to 40 wt% fat (a) or up to 25 wt% fat (c) or up to 35 wt% fat (d), or mixtures thereof, said non-interesterified fat or mixtures of fats constituting up to 50 wt% of the total fat blend.

In the mixture to be interesterified fat component (a) is preferably present in a proportion ranging from 28-45%, fat component (b) is preferably present in a proportion from 7-20% and fat component (c) is preferably present in a proportion from 15-40% (based on the weight of the mixture to be interesterified).

The mixture of fats to be interesterified optionally further comprises preferably less than 35% (based on the interesterified mixture) of a fat (d) with a melting point preferably ranging from 25°-50° C. such as palm oil, palm oil hydrogenated to a melting point of 42° C., rapeseed oil hydrogenated to a melting point of 36° C., soybean oil hydrogenated to a melting point of 43° C. and the like.

In the fatblend according to the invention the non-interesterified components are present within the following preferred ranges:

fat component (a); 8-35%
fat component (c); 5-20%
fat component (d); 5-25%

(based on the total weight of the fat blend).

The fat blends according to the invention can be produced without applying any fractionation i.e. they are free from fractionated fats. Ideally the fat blends according to the invention contain less than 40% hydrogenated fat (partially+fully hydrogenated fat).

The present invention is also concerned with water- and oil containing edible emulsions and particularly w/o emulsion spreads of the margarine or low-fat spreads type wherein the fat phase contains a fat blend as described above. Such products can be obtained in a way known per se e.g. as described in "Margarine" by Anderson and Williams, Pergamon Press 1965, using e.g. a Votator ® equipment.

Fat blends displaying some similarity with the fat blends according to the invention are described in NL 6903111 and NL 6709829. In Dutch patent application No. 6903111 fat blends are described which are produced by interesterification of a liquid oil, a partially saturated, hydrogenated fat and a lauric fat. In the present invention predominantly fully saturated fats (iodine value lower than 10) are used (instead of the predominantly partially hydrogenated fats used in the Dutch patent application) in order to achieve a relatively low level of trans fatty acids (less than 15% and preferably less than 10% trans).

In Dutch patent application No. 6709829 fat blends are described which are obtained by random interesterification of a lauric fat, a substantially fully saturated fat and a polyunsaturated oil. The fat blends according to this publication have a level of linoleic acid which is higher than the maximum level tolerated in the fat blends according to the invention and have a level of oleic acid which is lower than the minimal level of oleic acid present in the fat blends according to the present invention.

The products of Dutch patent application No. 6709829 are softer, more prone to oxidation and less stable (they display some oil exudation) than the products according to the present invention.

The invention will now be illustrated in the following Examples.

In the following examples the trans-fatty acids content was determined according to the method described in J.A.O.C.S. 54, 47 (1971) as elaidic acid content (isolated mono-trans).

The fatty acids composition was determined by means of gas-liquid chromatography after conversion of glycerol esters into methyl esters.

The triglycerides composition was determined by means of a calculation technique based on the statistic distribution of the fatty acids over the glycerol molecule after interesterification. The fats to be co-randomised were dried to a water content of about 0.01% by weight and subsequently co-randomised at 90° C. in a stirred vessel which was kept under a vacuum of 2 cm mercury, in the presence of 0.1% of sodium methoxide as a catalyst. After 20 minutes the mixture was cooled and the vacuum released. The catalyst was destroyed by washing the co-randomised blend with water and the fat was dried as before, and conventionally refined.

For the production of margarines the margarine fat blend was melted and emulsified with and aqueous phase prepared from soured milk containing 0.1% mono-diglycerides to give an emulsion containing 80% of fat. The emulsion was crystallised and worked in two closed tubular surface-scraped heat exchangers (Votator A-units); the latter of the two was left at a temperature of 10°–15° C. Between said Votator A-units a slowly agitated uncooled crystallizer was placed for increasing the residence time to about 2–3 minutes. The cristallised emulsion leaving the latter Votator A-unit was then passed through a resting tube (Votator B-unit), where it cristallised further for about 3 minutes. The margarine was then packed This and other methods for producing margarines are described in "Margarines", Andersen and Williams—Pergamon Press 1965. Low fat spreads can be produced almost as described above while using about 30%–60% aqueous phase instead of about 20% in the case of margarine.

EXAMPLE 1

A mixture of the following composition was randomly interesterified:

| | Wt. % |
|---|---|
| Coconut oil | 27 |
| Palm oil | 28 |
| Soybean oil | 35 |
| Soybean oil hydrogenated to a m.p. of 60° C. | 10 |

The interesterified mixture displayed the following fat solids profile:

$N_{10° C.} = 38.3$
$N_{15° C.} = 24.3$
$N_{20° C.} = 13.6$
$N_{25° C.} = 6.5$
$N_{30° C.} = 2.6$
$N_{35° C.} = 0$

The fatty acid composition of the interesterified mixture was as follows:

| | Wt. % | | Wt. % |
|---|---|---|---|
| $C_{12}$ | 12.9 | $C_{18.1}$ | 24.8 |
| $C_{14}$ | 5.4 | $C_{18.2}$ | 21.6 |
| $C_{16}$ | 14.8 | $C_{20}$ | — |
| $C_{18}$ | 12.2 | | |

Level of trans-fatty acids: 0%

The triglyceride composition of the interesterified mixture was as follows:

| | Wt. % | | Wt. % |
|---|---|---|---|
| $H_3$ (1) | 3 | $HM_2$ (7) | 3 |
| $H_2E$ (2) | 0 | $E_3$ (8) | 0 |
| $H_2M$ (3) | 5.2 | $E_2M/EM_2$ (9) | 0 |
| $H_2L$ (4) | 14.9 | $M_3$ (10) | 0.6 |
| $HE_2$ (5) | 0 | $L(M + E)_2$ (11) | 4.9 |
| HME (6) | 0 | $LH(M + E)$ (12) | 17.1 |

H = $C_{16}$–$C_{18}$ fatty acids
E = Elaidic acid
M = $C_{12}$–$C_{14}$ fatty acids
L = $C_4$–$C_{10}$; cis-mono- or poly-unsaturated fatty acids.

More than 50% of triglycerides (ii) as hereinbefore defined were asymmetrical. Margarine produced from the above fat blend displayed a good butterlike properties, i.e. a good plasticity and a good melting behaviour and a good stability on storage during 6 weeks.

EXAMPLE 2

A fat blend was produced having the following composition:

| | Wt. % |
|---|---|
| Randomly interesterified: | |
| Palm oil | 14 |
| Coconut oil | 21 |
| soybean oil | 28 |
| soybean oil hydrogenated to m.p 60° C. | 7 |
| Non-interesterified. | |
| palm oil | 15 |
| coconut oil | 5 |
| soybean oil | 10 |

The fat solids profile of the fat blend was:
$N_{10} = 32.3$
$N_{15} = 19.5$
$N_{20} = 10.5$
$N_{25} = 5.2$
$N_{30} = 0.2$
$N_{35} = 0.4$
The fatty acid composition of the fat blend was:
$C_{12} = 12.11$
$C_{14} = 5.40$
$C_{16} = 14.44$
$C_{18} = 9.57$
$C_{18.1} = 22.43$
$C_{18.2} = 24.80$
$C_{18.3} = 2.44$
The level of trans fatty acids was 0%.
The triglyceride composition of the total blend was as follows:

| | Wt. % | | Wt. % |
|---|---|---|---|
| $H_3$ | 2.5 | $E_3$ | 0 |
| $H_2E$ | 0 | $E_2M/EM_2$ | 0 |
| $H_2M$ | 3.5 | $M_3$ | 1.8 |
| $H_2L$ | 17 | $L(M + E)_2$ | 5.9 |
| $HE_2$ | 0 | $LH(M + E)$ | 12.7 |
| HME | 0 | | |

In the fat blend more than 50% of triglycerides (ii) as hereinbefore defined were asymmetrical. Margarines produced from the above fat blend displayed a good plasticity, a good melting behaviour and a good storage stability (after a storage period of 6 weeks).

EXAMPLE 3

A fat blend was produced from a randomly interesterified mixture and a non-interesterified mixture, with the following composition:

| Interesterified | palm oil | 10% |
|---|---|---|
| | coconut oil | 17.5% |
| | soybean oil | 15% |
| | soybean oil hydrogenated to a m.p. of 60° C. | 7.5% |
| Non-interesterified | palm oil | 15% |
| | coconut oil | 15% |
| | soybean oil | 20% |

The fat solids profile of the total blend was as follows:
$N_{10} = 37.7$
$N_{15} = 22.7$
$N_{20} = 13.2$
$N_{25} = 6.7$
$N_{30} = 3.1$
$N_{35} = 0.4$
The fatty acids composition of the fat blend was as follows:
$C_{12} = 14.3$
$C_{14} = 5.9$
$C_{16} = 16.1$
$C_{18} = 10.5$
$C_{18.1} = 22.7$
$C_{18.2} = 21.9$
The level of trans-fatty acids was 0%.
The triglyceride composition of the fatblend was as follows:

| | Wt. % | | Wt. % |
|---|---|---|---|
| $H_3$ | 2.6 | $HM_2$ | 4.4 |
| $H_2E$ | 0 | $E_3$ | 0 |
| $H_2M$ | 3.9 | $E_2M/EM_2$ | 0 |
| $H_2L$ | 15.9 | $M_3$ | 4.5 |
| $HE_2$ | 0 | $L(M + E)_2$ | 8.7 |
| HME | 0 | $LH(M + E)$ | 11.4 |

More than 50% of triglycerides (ii) as hereinbefore defined were asymmetrical. Margarines produced from the above fat blend displayed good butterlike properties, i.e. a good plasticity and a good melting behaviour, and a good storage stability (after a period of storage of 6 weeks).

TABLE

| | Carbonnumber (CN) profile | | |
|---|---|---|---|
| CN | Ex 1 | Ex 2 | Ex 3 |
| 38 | 1,3 | 2,37 | 4,1 |
| 40 | 2,3 | 2,40 | 3,4 |
| 42 | 5,1 | 4,57 | 4,8 |
| 44 | 6,6 | 5,25 | 4,8 |
| 46 | 11 | 7,84 | 6,4 |
| 48 | 17,6 | 14,43 | 11,2 |
| 50 | 12,5 | 14,05 | 12,3 |
| 52 | 20,3 | 19,91 | 19,1 |
| 54 | 20,3 | 23,36 | 23,2 |

I claim:
1. A fat blend comprising a mixture of triglycerides wherein lauric acid is present at a level ranging from 5-20 wt%, the sum of the levels of palmitic acid and stearic acid ranges from 18-40 wt%, the level of oleic acid ranges from 19-35 wt%, the level of unsaturated fatty acids in the transconfiguration is less than 15 wt% and the level of linoleic acid ranges from 18-35 wt%, up to 5 wt% of the mixture consisting of triglycerides (i) from 3 saturated fatty acids containing 16 or 18 C-atoms and at least 9 wt% of the mixture consisting of triglycerides (ii) from 2 saturated $C_{16}$- or $C_{18}$-fatty acids and 1 cis unsaturated $C_{16}$- or $C_{18}$-fatty acid, at least 50% of triglycerides (ii) being asymmetrical.

2. A fat blend according to claim 1, wherein 10-20 wt% of the mixture consists of triglycerides (ii).

3. A fat blend according to claim 1, wherein the level of unsaturated fatty acids in the trans configuration is less than 10%.

4. A fat blend according to claim 1, wherein the mixture of triglycerides have the following carbon number profile:
$C_{38} = 1-6$
$C_{40} = 2-4$
$C_{42} = 3-8$
$C_{44} = 3-8$
$C_{46} = 4-12$
$C_{48} = 8-20$
$C_{50} = 7-14$
$C_{52} = 14-22$
$C_{54} = 18-40$.

5. A fat blend according to claim 1, have the following fat solid profile determined by nuclear magnetic resonance:

$N_{10} = 25-55$
$N_{20} = 10-25$
$N_{30} = 0-6$
$N_{35} = 0-2.5$.

6. A fat blend according to claim 1, which is substantially free from fractionated fats.

7. A fat blend according to claim 1, which contains less than 20 wt% partially hydrogenated fat.

8. A fat blend according to claim 1 wherein the mixture of triglycerides is obtained by random interesterification of a fat (a) rich in cis-mono-di- and/or polyunsaturated fatty acids, a substantially saturated fat (b) having an iodine value not exceeding 10 consisting of triglycerides essentially from $C_{16}$- and/or $C_{18}$-fatty acids, a fat (c) rich in saturated $C_{12}$- and/or $C_{14}$-fatty acids and 0-35 wt% of a fat (d) having a melting point ranging from 25°-60° C., and 0-50 wt% of a non-interesterified fat (a), (c) or (d) or mixtures thereof.

9. A fat blend according to claim 8, wherein fat (a) is selected from the group consisting of sunflower-, soybean-, rapeseed-, maize-, safflower- and peanut oil, fat (b) is selected from the group consisting of substantially fully hydrogenated sunflower-, soybean-, rapeseed-, maize-, safflower-, peanut- and palm oil, fat (c) is selected from the group consisting of coconut-, palmkernel-, babassu-, tucum-, and ouricurum fat and fat (d) is selected from the group consisting of palm oil, partially hydrogenated palm oil and partially hydrogenated fat (a).

10. A fat blend according to claim 8, wherein the mixture of triglycerides is obtained by random interesterification of 20-50 wt% fat (d), said interesterified mixture constituting 50-100 wt% of the total fat blend and (ii) a non-interesterified fat consisting of up to 40 wt% fat (a) or up to 25 wt% fat (c) or up to 35 wt% fat (d), or mixtures thereof, said non-interesterified fat or mixtures of these fats constituting up to 50 wt% of the total fat blend.

11. A fat blend according to claim 10, wherein the total level of partially and fully hydrogenated fat does not exceed 40 wt% of the total fat blend.

12. Oil- and water containing emulsions wherein the fat phase contains a fat blend as claimed in any one of claims 1-11.

13. Water-in-oil emulsions of the margarine and reduced fat spread types, wherein the fat phase contains a fat blend as claimed in any one of claims 1-11.

* * * * *